(12) United States Patent
Kasai et al.

(10) Patent No.: US 8,541,996 B2
(45) Date of Patent: Sep. 24, 2013

(54) POWER CONTROL DEVICE, POWER SUPPLY DEVICE, AND POWER CONTROL METHOD

(75) Inventors: Toshihiko Kasai, Kasugai (JP); Hidenobu Ito, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 324 days.

(21) Appl. No.: 12/778,812

(22) Filed: May 12, 2010

(65) Prior Publication Data

US 2010/0289471 A1    Nov. 18, 2010

(30) Foreign Application Priority Data

May 18, 2009  (JP) .................. 2009-119475

(51) Int. Cl.
G05F 1/10 (2006.01)
G05F 1/652 (2006.01)
G05F 1/44 (2006.01)

(52) U.S. Cl.
USPC ........... 323/282; 323/284; 323/285; 323/286; 323/222; 323/223; 323/224

(58) Field of Classification Search
USPC ............... 323/282, 284, 285, 286, 222, 223, 323/224
See application file for complete search history.

(56) References Cited

U.S. PATENT DOCUMENTS

| | | | | |
|---|---|---|---|---|
| 6,100,675 A | * | 8/2000 | Sudo | 323/282 |
| 6,404,076 B1 | * | 6/2002 | Matsuda et al. | 307/80 |
| 7,148,587 B2 | * | 12/2006 | Matsuda et al. | 307/80 |
| 7,298,117 B2 | * | 11/2007 | Hasegawa et al. | 323/222 |
| 7,443,147 B2 | * | 10/2008 | Kasai et al. | 323/259 |
| 7,696,738 B2 | * | 4/2010 | Kasai et al. | 323/285 |
| 7,821,236 B2 | * | 10/2010 | Hasegawa et al. | 323/222 |
| 2003/0168916 A1 | * | 9/2003 | Matsuda et al. | 307/75 |
| 2006/0071651 A1 | * | 4/2006 | Ito | 323/351 |
| 2006/0164056 A1 | * | 7/2006 | Deguchi | 323/282 |
| 2006/0181260 A1 | * | 8/2006 | Ito | 323/315 |
| 2006/0261790 A1 | * | 11/2006 | Tai et al. | 323/274 |
| 2008/0067989 A1 | * | 3/2008 | Kasai et al. | 323/271 |
| 2008/0136383 A1 | * | 6/2008 | Hasegawa et al. | 323/271 |
| 2009/0153124 A1 | * | 6/2009 | Ishii | 323/290 |
| 2009/0322303 A1 | | 12/2009 | Hirata et al. | |
| 2010/0026267 A1 | * | 2/2010 | Easwaran et al. | 323/288 |

FOREIGN PATENT DOCUMENTS

| | | |
|---|---|---|
| JP | 2003-219637 A | 7/2003 |
| JP | 2007-209180 A | 8/2007 |
| JP | 2007-228760 A | 9/2007 |
| JP | 2010-11576 | 1/2010 |

OTHER PUBLICATIONS

Office Action dated Jun. 25, 2013 received from Japanese Patent Office in a counterpart Japanese patent application.

* cited by examiner

Primary Examiner — Bao Q Vu
(74) Attorney, Agent, or Firm — Arent Fox LLP

(57) ABSTRACT

A power control device for performing switching control for an output voltage of a power supply device includes a signal generation circuit for comparing a difference between a value of the output voltage and a value of a first reference voltage with a value of a second reference voltage, and for stopping the switching control when a value of the difference is less than or equal to the value of the second reference voltage, and an adjuster circuit for adjusting the second reference voltage based on a ratio between a value of an input voltage and the value of the output voltage.

16 Claims, 8 Drawing Sheets

POWER CONTROL DEVICE, POWER SUPPLY DEVICE, AND POWER CONTROL METHOD

CROSS-REFERENCE TO RELATED APPLICATION

This application is based upon and claims the benefit of priority of the prior Japanese Patent Application No. 2009-119475, filed on May 18, 2009, the entire contents of which are incorporated herein by reference.

FIELD

The embodiments discussed herein relate to a power control device, a power supply device, and a power control method.

BACKGROUND

DC-DC converter control techniques may include a pulse width modulation (PWM) control in which an output voltage is controlled to be constant by changing a pulse width while maintaining a constant frequency, and a pulse frequency modulation (PFM) control in which an output voltage is controlled to be constant by changing a clock cycle while maintaining a constant pulse width. For example, the PFM control is performed in a mode in which a frequency is changed continuously, or in a mode in which a frequency is changed by excluding a clock used in the PWM control. A switching frequency may be controlled in both modes.

In the PWM control, switching operations are performed per cycle even when a load is high or low. When the load is low, the amount of power consumed for the switching operations is relatively large compared with the amount of power that is supplied, and power supply efficiency may be reduced. Thus, the PWM control may be unsuitable when the load is low. In the PFM control, generally, a frequency range that may be changed (the switching frequency) is not limited. However, when a width in which the frequency is changed increases, broadband radiation noise is generated. For these reasons, a DC-DC converter may be operated in the PWM control when the load is high, and may be operated in the PFM control when the load is low. Japanese Patent Application Laid-Open Publication No. 2003-219637 discusses that frequent switching of driving operations may be reduced by making a difference between a level set when the PWM control is switched to the PFM control and a level set when the PFM control is switched to the PWM control.

A power supply device including an error amplifier may detect an output voltage, perform a switching control based on a difference between the value of the output voltage and the value of a reference voltage, and adjust the output voltage. Operational conditions of such a power supply device may change depending on a ratio between the value of an input voltage and the value of an output voltage. As a result, a difference between the value of an output voltage of an error amplifier and the value of another reference voltage may fail to satisfy given conditions even when an operating mode of the power supply device actually needs to be switched. In this case, it may be difficult to switch the operating mode under desired operating conditions.

SUMMARY

According to an aspect of the embodiments, a power control device for performing switching control for an output voltage of a power supply device includes a signal generation circuit for comparing a difference between a value of the output voltage and a value of a first reference voltage with a value of a second reference voltage, and for stopping the switching control when a value of the difference is less than or equal to the value of the second reference voltage, and an adjuster circuit for adjusting the second reference voltage based on a ratio between a value of an input voltage and the value of the output voltage.

The object and advantages of the various aspects of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the following descriptions, many of the exemplary aspects are shown to include n-channel metal-oxide-semiconductor field-effect transistors (MOSFETs) in a variety of configurations. While MOSFET devices are used as an example, the disclosed circuits may be implemented using any number of other transistor types, such as J-FETs and bipolar transistors, among others. Additionally, while n-channel devices are used in the following exemplary aspects, the same general approaches may also apply to circuits incorporating p-channel FETs or PNP bipolar transistors, for example.

Still further, while terms "drain" and "source" are used for ease of explanation and to adhere to traditional engineering usage, it should be recognized that a drain and source of a FET transistor may be considered interchangeable, and for the following descriptions merely thought of as a first end and a second end of a semiconductor channel unless otherwise stated or apparent to one of ordinary skill in the art.

An example of a power supply device is described below with reference to FIG. 1.

Figure 1:
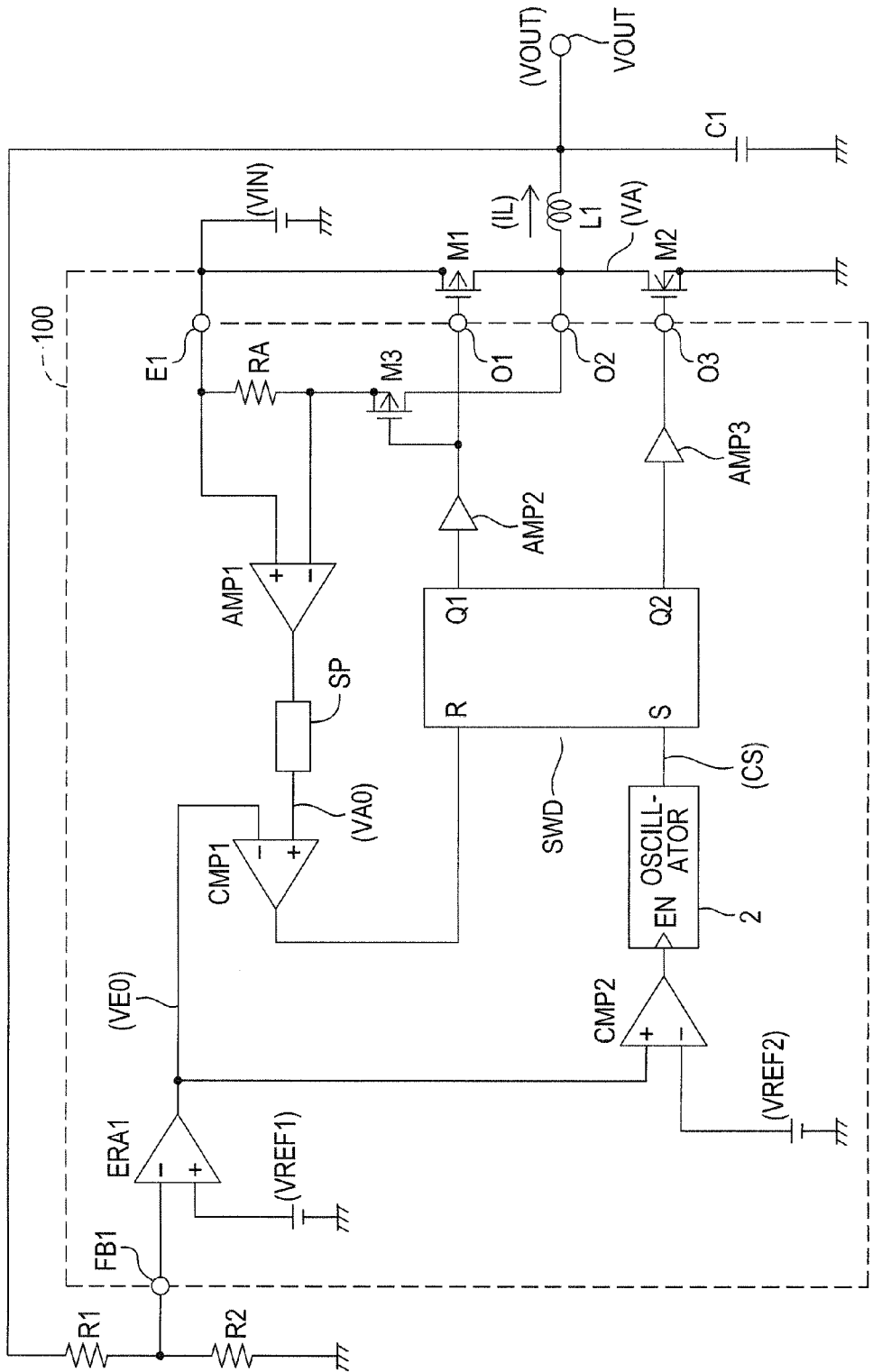
FIG. 1 illustrates a power supply device.

As illustrated in FIG. 1, the power supply device includes a power control device 100. In the power control device 100, a comparator CMP2 compares a voltage (VE0) with a second reference voltage (VREF2). When the voltage (VE0) is higher than or equal to the second reference voltage (VREF2), a cycle signal (CS) is output. When the voltage (VE0) is lower than the second reference voltage (VREF2), the output of the cycle signal (CS) is stopped.

In the power supply device in FIG. 1, control operations are performed so that the value of an output voltage (VOUT) may reach a set value. The set value may be obtained from the expression $((RV1+RV2)/RV2) \times V1$, where V1 represents the value of a first reference voltage (VREF1), RV1 represents the resistance value of a resistor R1, and RV2 represents the resistance value of a resistor R2.

An outside configuration of the power control device 100 is described below.

As illustrated in FIG. 1, an input voltage (VIN) is applied to an input terminal E1 of the power control device 100 and to the source terminal of a P-channel metal oxide semiconductor (PMOS) transistor M1. The gate terminal of the PMOS transistor M1 is coupled to an output terminal O1 of the power control device 100. The drain terminal of the PMOS transistor M1, an output terminal O2 of the power control device 100, the drain terminal of an N-channel metal oxide semiconductor (NMOS) transistor M2, and a terminal of a coil L1 are coupled to each other.

As further illustrated in FIG. 1, the gate terminal of the NMOS transistor M2 is coupled to an output terminal O3 of the power control device 100. The source terminal of the NMOS transistor M2 is grounded. The other terminal of the coil L1, a terminal of an output capacitor C1, an output terminal VOUT of the power supply device, and a terminal of a resistor R1 are coupled to each other. A voltage that is generated at the output terminal VOUT is an output voltage (VOUT) of the power supply device. The other terminal of the output capacitor C1 is grounded. The other terminal of the resistor R1, a feedback terminal FB1 of the power control device 100, and a terminal of the resistor R2 are coupled to each other. The other terminal of the resistor R2 is grounded. A voltage division circuit including the resistors R1 and R2 is illustrated in FIG. 1. The coupling point of the other terminal of the resistor R1 and the ungrounded terminal of the resistor R2 is a voltage dividing point of the voltage division circuit.

Any one of the resistor R1, the resistor R2, the PMOS transistor M1, and the NMOS transistor M2 may be included in an inside configuration of the power control device 100. A voltage of the terminal FB1 may be referred to for an input to a terminal FB2 (not depicted).

The inside configuration of the power control device 100 in FIG. 1 is described below.

The feedback terminal FB1 is coupled to an inverting input terminal of an error amplifier ERA1. A non-inverting input terminal of the error amplifier ERA1 receives the first reference voltage (VREF1). The error amplifier ERA1 used herein may be a typical operational amplifier.

As further illustrated in FIG. 1, the error amplifier ERA1 compares the first reference voltage (VREF1) with the divided voltage of the output voltage (VOUT) and outputs a voltage (VE0) dependent on a difference between the value of the first reference voltage (VREF1) and the value of the divided voltage of the output voltage (VOUT). The voltage (VE0) increases as the divided voltage of the output voltage (VOUT) drops below the first reference voltage (VREF1), and the voltage (VE0) decreases as the divided voltage of the output voltage (VOUT) rises above the first reference voltage (VREF1). The voltage (VE0) is substantially proportional to a size of the load. For example, the voltage (VE0) increases with a high load, and decreases with a low load.

The high load implies that the amount of a coil current (IL) is large, and the low load implies that the amount of the coil current (IL) is small. As the set value is larger, the load is higher. As the set value is smaller, the load is lower. A large amount of the coil current (IL) is desired to maintain the output voltage (VOUT) at a high level.

As further illustrated in FIG. 1, an output terminal of the error amplifier ERA1 is coupled to a non-inverting input terminal of the comparator CMP2 and to an inverting input terminal of a comparator CMP1. The inverting input terminal of the comparator CMP2 receives the second reference voltage (VREF2). The comparator CMP2 outputs a high-level signal when the voltage (VE0) is higher than or equal to the second reference voltage (VREF2), and outputs a low-level signal when the voltage (VE0) is lower than the second reference voltage (VREF2).

As further illustrated in FIG. 1, an output terminal of the comparator CMP2 is coupled to an enable terminal EN of an oscillator 2. The oscillator 2 outputs the cycle signal (CS) when a logic level of a signal input to the enable terminal EN is high. The oscillator 2 stops the output of the cycle signal (CS) when the logic level of the signal input to the enable terminal EN is low.

As further illustrated in FIG. 1, the output terminal of the oscillator 2 is coupled to a set terminal S of a transistor drive circuit SWD. An output terminal Q1 of the transistor drive circuit SWD is coupled to the gate terminal of a PMOS transistor M3 through an amplifier AMP2. The drain terminal of the PMOS transistor M3 is coupled to the output terminal O2. The output terminal Q1 of the transistor drive circuit SWD is coupled to the output terminal O1 through the amplifier AMP2. An output terminal Q2 of the transistor drive circuit SWD is coupled to the output terminal O3 through an amplifier AMP3.

As further illustrated in FIG. 1, the transistor drive circuit SWD enters a set state when the cycle signal (CS) input to the set terminal S reaches a high level. When the transistor drive circuit SWD enters the set state, the transistor drive circuit SWD outputs low-level signals from the output terminals Q1 and Q2. When a high-level signal is input to a reset terminal R of the transistor drive circuit SWD, the transistor drive circuit SWD enters a reset state. When the transistor drive circuit SWD enters the reset state, the transistor drive circuit SWD outputs high-level signals from the output terminals Q1 and Q2. The transistor drive circuit SWD controls the output voltage (VOUT) by repeating entering the set and reset states.

As further illustrated in FIG. 1, an input terminal E1 is coupled to a non-inverting input terminal of an amplifier AMP1 and to a terminal of a resistor RA. The other terminal of the resistor RA is coupled to an inverting input terminal of the amplifier AMP1 and to the source terminal of the PMOS transistor M3. The amplifier AMP1 is coupled to the non-inverting input terminal of the comparator CMP1 through a slope compensation circuit SP The output terminal of the comparator CMP1 is coupled to the reset terminal R of the transistor drive circuit SWD. When the comparator CMP1 operates, the value of the voltage (VE0) that is input to the inverting input terminal of the comparator CMP1, and the largest value of the voltage (VA0) obtained by performing the current-to-voltage conversion to the coil current (IL) that is input to the non-inverting input terminal of the comparator CMP1 may be balanced in the power supply device in FIG. 1.

The slope compensation circuit SP in FIG. 1 performs slope compensation in a period in which a duty ratio is 50% or more. The slope compensation includes offset control with respect to a certain voltage. In FIG. 1, the certain voltage is the voltage (VA0) obtained by the voltage conversion. Details of the "duty ratio" are described later.

The slope compensation is performed to reduce subharmonic oscillation. The occurrence of the subharmonic oscillation is generally unwelcome in a typical power supply device because when the subharmonic oscillation occurs, the current flow through a coil may become unstable and broadband emission noise may be generated from the coil. The subharmonic oscillation may occur when the duty ratio is 50% or more.

Figure 2A:
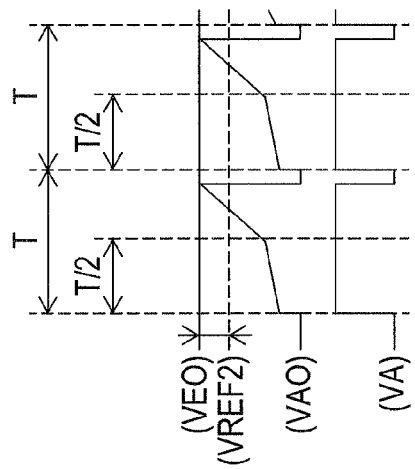
FIG. 2A illustrates waveforms of the power supply device in FIG. 1, a power supply device in FIG. 3, and a power supply device in FIG. 6, which are obtained when a duty ratio is less than 50%.
Figure 2B:
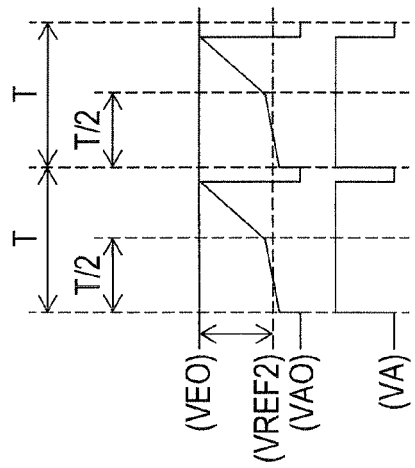
FIG. 2B illustrates waveforms of the power supply device in FIG. 1, which are obtained when the duty ratio is 50% or more.
Figure 2C:
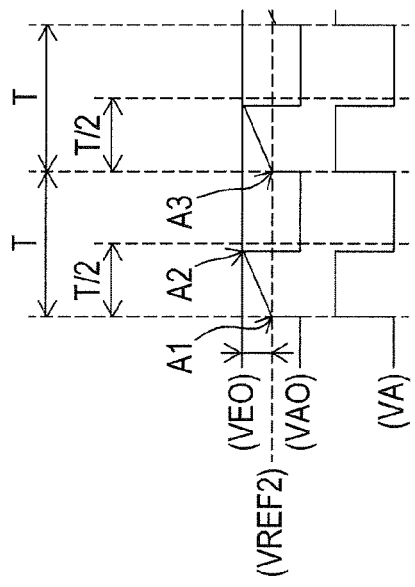
FIG. 2C illustrates waveforms of the power supply devices in FIGS. 3 and 6, which are obtained when the duty ratio is 50% or more.

Operations of the power supply device in FIG. 1 are described below with reference to FIGS. 2A, 2B, and 2C. FIG. 2A illustrates operation waveforms of the power supply device in FIG. 1, a power supply device according to the first embodiment in FIG. 3, and a power supply device according to the second embodiment in FIG. 6. FIG. 2B illustrates operation waveforms of the power supply device in FIG. 1. FIG. 2C illustrates operation waveforms of the power supply devices in FIGS. 3 and 6.

As illustrated in FIG. 2A, the oscillator 2 outputs the cycle signal (CS) when the voltage (VE0) is higher than or equal to the second reference voltage (VREF2). When the cycle signal (CS) at a high level is input to the set terminal S of the transistor drive circuit SWD, the transistor drive circuit SWD enters the set state. When the transistor drive circuit SWD enters the set state, the transistor drive circuit SWD outputs low-level signals from the output terminals Q1 and Q2 and maintains the output signals. As a result, the PMOS transistors M1 and M3 are turned on, and the NMOS transistor M2 is turned off. The coil current (IL) based on the input voltage (VIN) is supplied to the coil L1 (see A1 in FIG. 2A). The coil current (IL) increases toward a value that corresponds to the voltage (VE0) of the error amplifier ERA1.

As further illustrated in FIG. 2A, the comparator CMP1 outputs a high-level signal when the voltage (VA0), which is obtained by performing current-to-voltage conversion to the coil current (IL), is higher than or equal to the voltage (VE0) of the error amplifier ERA1 (see A2 in FIG. 2A). When the high-level signal is input to the reset terminal R of the transistor drive circuit SWD, the transistor drive circuit SWD enters the reset state.

When the transistor drive circuit SWD enters the reset state, the transistor drive circuit SWD outputs high-level signals from the output terminals Q1 and Q2 and maintains the output signals. As a result, the PMOS transistors M1 and M3 are turned off, the NMOS transistor M2 is turned on, and the current supply based on the input voltage (VIN) is stopped.

When the oscillator 2 outputs the high-level cycle signal (CS) again, the transistor drive circuit SWD reenters the set state. As further illustrated in FIG. 2A, the coil current (IL) based on the input voltage (VIN) is supplied to the coil L1 (see A3 in FIG. 2A). Thus, when the transistor drive circuit SWD repeats entering the set and reset states, the output voltage (VOUT) may be maintained at the set value.

When the transistor drive circuit SWD repeats entering the set and reset states, a drain-source voltage (VA) of the NMOS transistor M2 periodically changes. When the oscillator 2 outputs the cycle signal (CS), the change cycle of the drain-source voltage (VA) of the NMOS transistor M2 depends on the output cycle of the cycle signal (CS). The set state of the transistor drive circuit SWD is referred to as an "ON period," and the reset state of the transistor drive circuit SWD is referred to as an "OFF period" hereinafter. The proportion of the ON period of the transistor drive circuit SWD in one operational cycle of the cycle signal (CS) is referred to as the "duty ratio." A period corresponding to the one operational cycle is represented by T in FIGS. 2A, 2B, and 2C.

The duty ratio may be obtained by dividing the set value of the output voltage (VOUT) by the value of the input voltage (VIN). Since the set value tends to be large with a high load, the ratio of the set value to the value of the input voltage (VIN) is close to 1:1, and the value of the duty ratio is large when the load is high. Since the set value tends to be small with a low load, the ratio of the set value to the value of the input voltage (VIN) deviates from 1:1, and the value of the duty ratio becomes small when the load is low.

When the value of the input voltage (VIN) is double the set value in the power supply device in FIG. 1, the duty ratio is 50%. When the duty ratio is 50% or more, the compensation circuit SP performs the slope compensation. As the ratio of the set value to the value of the input voltage (VIN) becomes closer to 1:1, the value of the duty ratio becomes larger. When the slope compensation is performed for a long period, the value of the voltage (VA0), which is obtained by performing the current-to-voltage conversion to the coil current (IL) of the coil L1, increases. As described above, when the comparator CMP1 operates, the value of the voltage (VE0) that is input to the inverting input terminal of the comparator CMP1, and the largest value of the voltage (VA0) obtained by performing the current-to-voltage conversion to the coil current (IL) that is input to the non-inverting input terminal of the comparator CMP1 may be balanced. Consequently, when the value of the voltage (VA0) increases, the value of the voltage (VE0) increases as well.

For example, the voltage (VE0) may transition, from a state in which the voltage (VE0) is higher than or equal to the second reference voltage (VREF2) and the load is high, into a state in which the voltage (VE0) is lower than the second reference voltage (VREF2) and the load is low. When the slope compensation is performed, a time period that the comparator CMP2 typically takes to output the low-level signal and a time period that the oscillator 2 typically takes to stop the output of the cycle signal (CS) may be longer compared with a case where the slope compensation is not performed.

FIGS. 2A and 2B are compared. FIG. 2A illustrates operation waveforms of the power supply device in FIG. 1 when the duty ratio is less than 50%. FIG. 2B illustrates operation waveforms of the power supply device in FIG. 1 when the duty ratio is 50% or more. Here, the relationships between the voltage (VE0) and the second reference voltage (VREF2) should be noted. The voltage (VE0) decreases as the load becomes lower, although the decrease is not illustrated in FIGS. 2A and 2B. When the voltage (VE0) becomes less than the second reference voltage (VREF2), the oscillator 2 stops the output of the cycle signal (CS). When the duty ratio is 50% or more (see FIG. 2B), a difference between the value of the voltage (VE0) and the value of the second reference voltage (VREF2) is larger compared with a case where the duty ratio is less than 50% (see FIG. 2A). Thus, the oscillator 2 may take a longer time period to stop the output of the cycle signal (CS).

Figure 3:
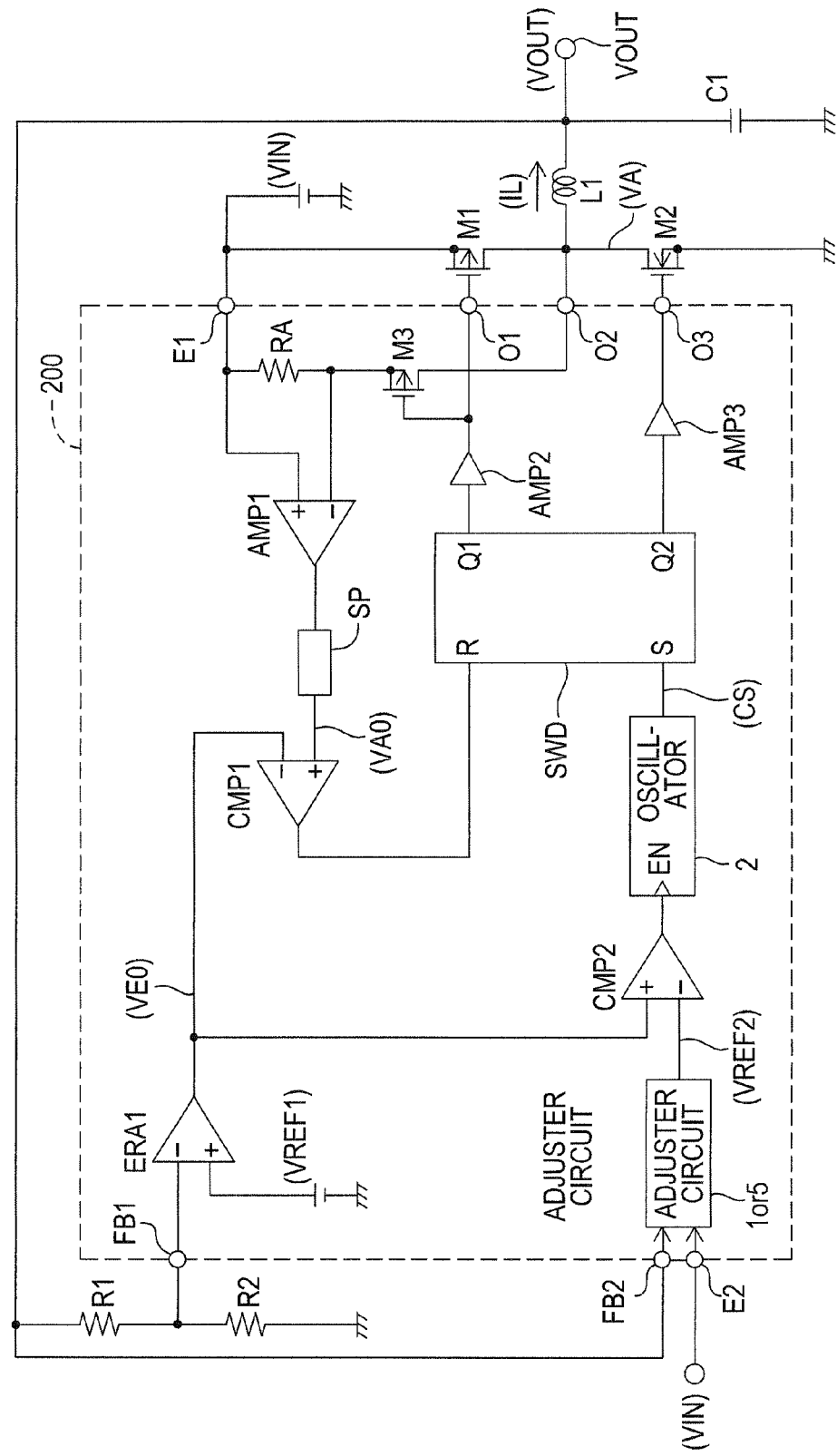
FIG. 3 illustrates the power supply device according to a first embodiment.

The present invention discusses a configuration in which an increase in the time period that the oscillator 2 typically takes to stop the output of the cycle signal (CS) may be reduced or prevented even when slope compensation is performed. FIG. 3 illustrates a power supply device according to a first embodiment and the configuration thereof is described below.

As illustrated in FIG. 3, the power supply device includes a power control device 200. Elements similar to those in the power supply device in FIG. 1 are denoted with the same reference numerals and the description thereof is omitted.

As further illustrated in FIG. 3, an output voltage (VOUT) is applied to an adjuster circuit 1 or 5 through a feedback terminal FB2. An input voltage (VIN) is input to the adjuster circuit 1 or 5 through an input terminal E2. In the power supply device according to the first embodiment, the adjuster circuit 1 or 5 outputs a second reference voltage (VREF2).

Figure 4:
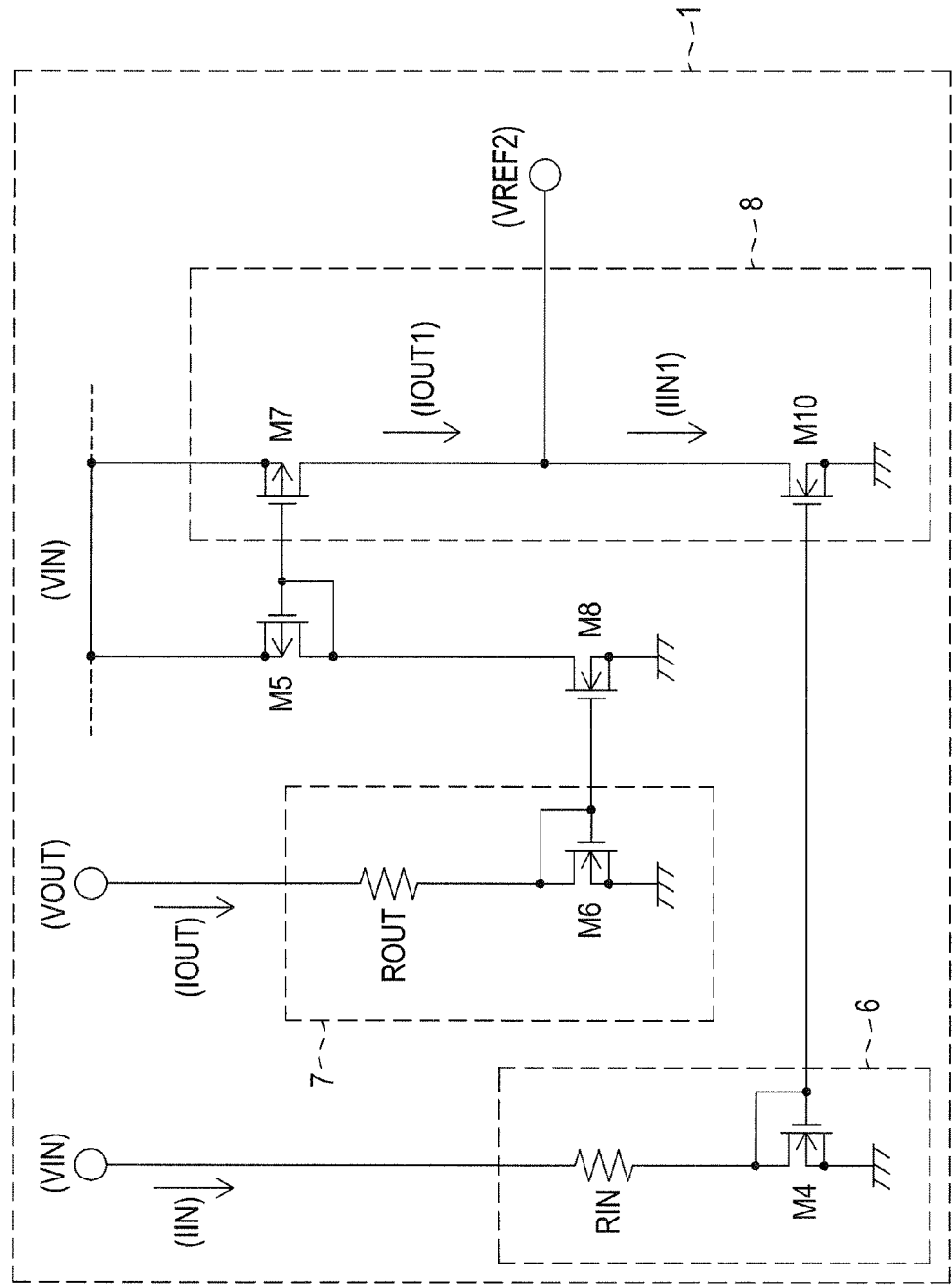
FIG. 4 illustrates a first adjuster circuit of the power supply device in FIG. 3.

FIG. 4 depicts a configuration of the first adjuster circuit 1 in FIG. 3 illustrating the first embodiment. The configuration of the first adjuster circuit 1 in FIG. 4 is described below.

As illustrated in FIG. 4, the input voltage (VIN) is applied to a terminal of a resistor RIN. The other terminal of the resistor RIN is coupled to the gate terminal of an NMOS transistor M4, the drain terminal of the NMOS transistor M4, and the gate terminal of an NMOS transistor M10. The source terminal of the NMOS transistor M4 is grounded. The source terminal of the NMOS transistor M10 is grounded.

As further illustrated in FIG. 4, the drain terminal of the NMOS transistor M10 is coupled to the drain terminal of a PMOS transistor M7. The source terminal of the PMOS transistor M7 receives the input voltage (VIN). The gate terminal of the PMOS transistor M7 is coupled to the gate terminal of a PMOS transistor M5, the drain terminal of the PMOS transistor M5, and the drain terminal of an NMOS transistor M8. The source terminal of the PMOS transistor M5 receives the input voltage (VIN). The source terminal of the NMOS transistor M8 is grounded. The gate terminal of the NMOS transistor M8 is coupled to the gate terminal of an NMOS transistor M6, the drain terminal of the NMOS transistor M6, and a terminal of a resistor ROUT. The source terminal of the NMOS transistor M6 is grounded. The other terminal of the resistor ROUT receives the output voltage (VOUT).

As further illustrated in FIG. 4, the coupling point of the drain terminals of the PMOS transistor M7 and the NMOS transistor M10 is an output terminal of the first adjuster circuit 1. The output terminal of the first adjuster circuit 1 outputs the second reference voltage (VREF2).

Operations of the first adjuster circuit 1 in FIG. 4 are described below. Referring to FIG. 4, the first adjuster circuit 1 adjusts the second reference voltage (VREF2) based on the ratio of the value of the output voltage (VOUT) to the value of the input voltage (VIN) when the output voltage (VOUT) is maintained at a given value. A current (IOUT), which is set based on the output voltage (VOUT) and the resistance of the resistor ROUT, flows through a current mirror circuit including the NMOS transistors M6 and M8, and a current mirror circuit including PMOS transistors M5 and M7, and a current (IOUT1) flows through the PMOS transistor M7. A current (IIN), which is set based on the input voltage (VIN) and the resistance of the resistor RIN, flows through a current mirror circuit including the NMOS transistors M4 and M10, and a current (IIN1) flows through the NMOS transistor M10.

As further illustrated in FIG. 4, the second reference voltage (VREF2) is output from the coupling point of the drain terminals of the PMOS transistor M7 and the NMOS transistor M10 based on the current (IOUT1) flowing through the PMOS transistor M7, and the current (IIN1) flowing through the NMOS transistor M10.

Still referring to FIG. 4, when the output voltage (VOUT) is maintained at the given value, the value of the second reference voltage (VREF2) increases as the value of the input voltage (VIN) decreases. In the first adjuster circuit 1, the value of the second reference voltage (VREF2) increases as the ratio of the value of the output voltage (VOUT) to the value of the input voltage (VIN) approaches 1:1.

Advantages of the first adjuster circuit 1 in FIG. 4 are described below. The slope compensation enables the value of the second reference voltage (VREF2) to increase based on the ratio of the value of the output voltage (VOUT) to the value of the input voltage (VIN) even when the voltage (VE0) increases. Thus, the difference between the value of the voltage (VE0) and the value of the second reference voltage (VREF2) may be kept small and the increase in the time period that the oscillator 2 typically takes to stop the cycle signal (CS) may be reduced or prevented. FIG. 2C implies advantages of the first adjuster circuit 1 in FIG. 1.

Figure 5:
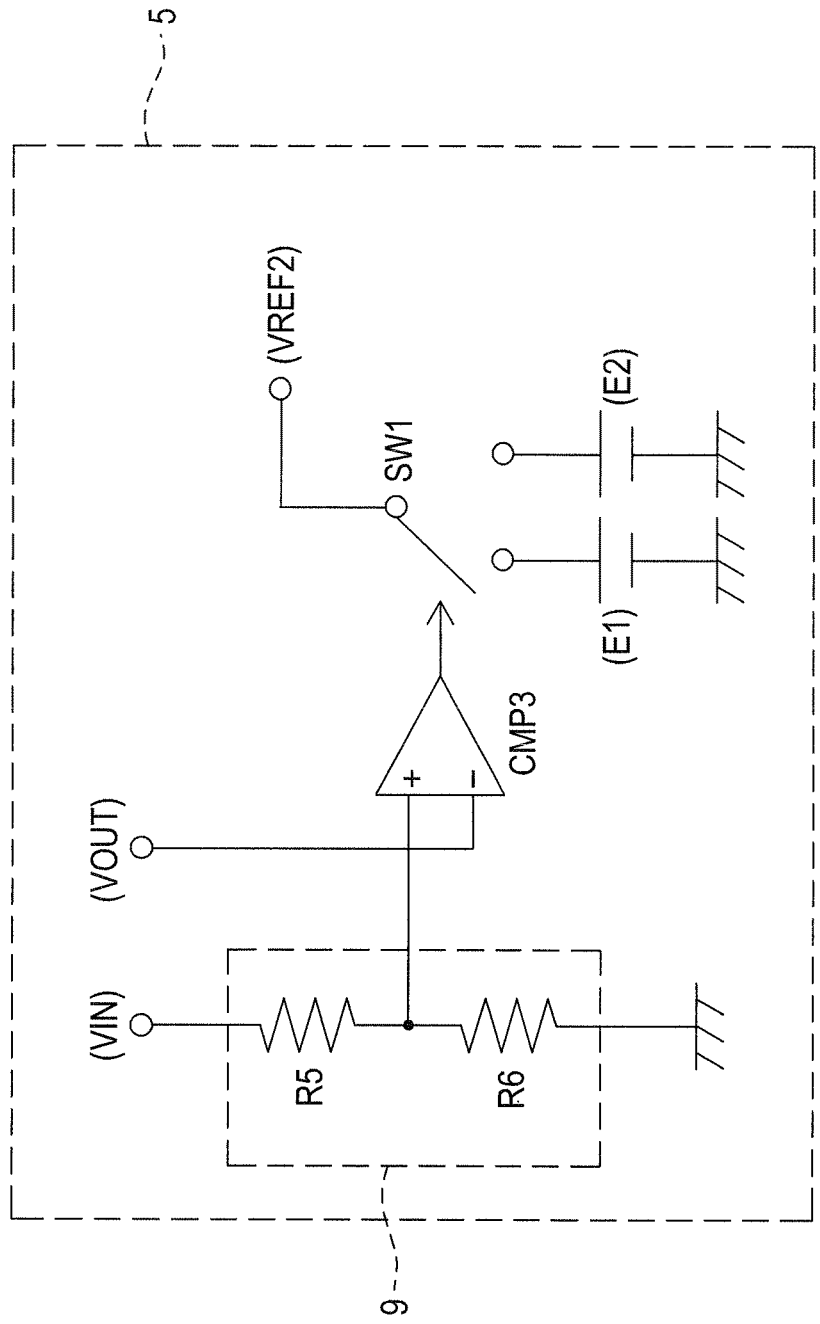
FIG. 5 illustrates a second adjuster circuit of the power supply device in FIG. 3.

As illustrated in FIG. 3, the second adjuster circuit 5 in FIG. 5 may be used in the first embodiment instead of the first adjuster circuit 1 in FIG. 4. FIG. 5 illustrates the second adjuster circuit 5 in detail.

Referring to FIG. 5, the input voltage (VIN) is input to a terminal of a resistor R5. The other terminal of the resistor R5 is coupled to a terminal of a resistor R6. The other terminal of the resistor R6 is grounded. The resistance values of the resistors R5 and R6 are substantially the same. A voltage division circuit 9 includes the resistors R5 and R6. The coupling point of the resistors R5 and R6 is coupled to a non-inverting input terminal of a comparator CMP3. An inverting input terminal of the comparator CMP3 receives the output voltage (VOUT).

As further illustrated in FIG. 5, an output terminal of the comparator CMP3 is coupled to a control terminal of a switching circuit SW1. A first terminal of the switching circuit SW1 receives a constant voltage (E1). A second terminal of the switching circuit SW1 receives a constant voltage (E2) having a value greater than the value of the constant voltage (E1). A third terminal of the switching circuit SW1 functions as an output terminal of the adjuster circuit 5, and the third terminal of the switching circuit SW1 outputs the second reference voltage (VREF2).

Operations of the second adjuster circuit 5 in FIG. 5 are described below. The input voltage (VIN) is applied to one of the terminals of the resistor R5. A half of the input voltage (VIN) is applied to the non-inverting input terminal of the comparator CMP3. The comparator CMP3 compares the half of the input voltage (VIN) with the output voltage (VOUT).

Still referring to FIG. 5, when the value of the half of the input voltage (VIN) becomes larger than or equal to the value of the output voltage (VOUT), the comparator CMP3 outputs a high-level signal. When the high-level signal is input to the control terminal of the switching circuit SW1, the first terminal of the switching circuit SW1 and the third terminal of the switching circuit SW1 are coupled to each other. Thus, the value of the second reference voltage (VREF2) becomes substantially the same as the value of the constant voltage (E1).

As further illustrated in FIG. 5, when the voltage of the half of the input voltage (VIN) becomes smaller than the value of the output voltage (VOUT), the comparator CMP3 outputs a low-level signal. When the low-level signal is applied to the control terminal of the switching circuit SW1, the second terminal of the switching circuit SW1 and the third terminal of the switching circuit SW1 are coupled to each other. Thus, the value of the second reference voltage (VREF2) becomes substantially the same as the value of the constant voltage (E2) that has a value greater than the value of the constant voltage (E1).

Advantages of the second adjuster circuit 5 in FIG. 5 are described below. In the second adjuster circuit 5, the value of the second reference voltage (VREF2) increases concurrently with the slope compensation when the value of the output voltage (VOUT) is considerably close to or almost the same as the set value. Thus, the difference between the value of the voltage (VE0) and the value of the second reference voltage (VREF2) may be kept small and the lengthening the time period that the oscillator 2 typically takes to stop the output of the cycle signal (CS) may be reduced or prevented.

Figure 6:
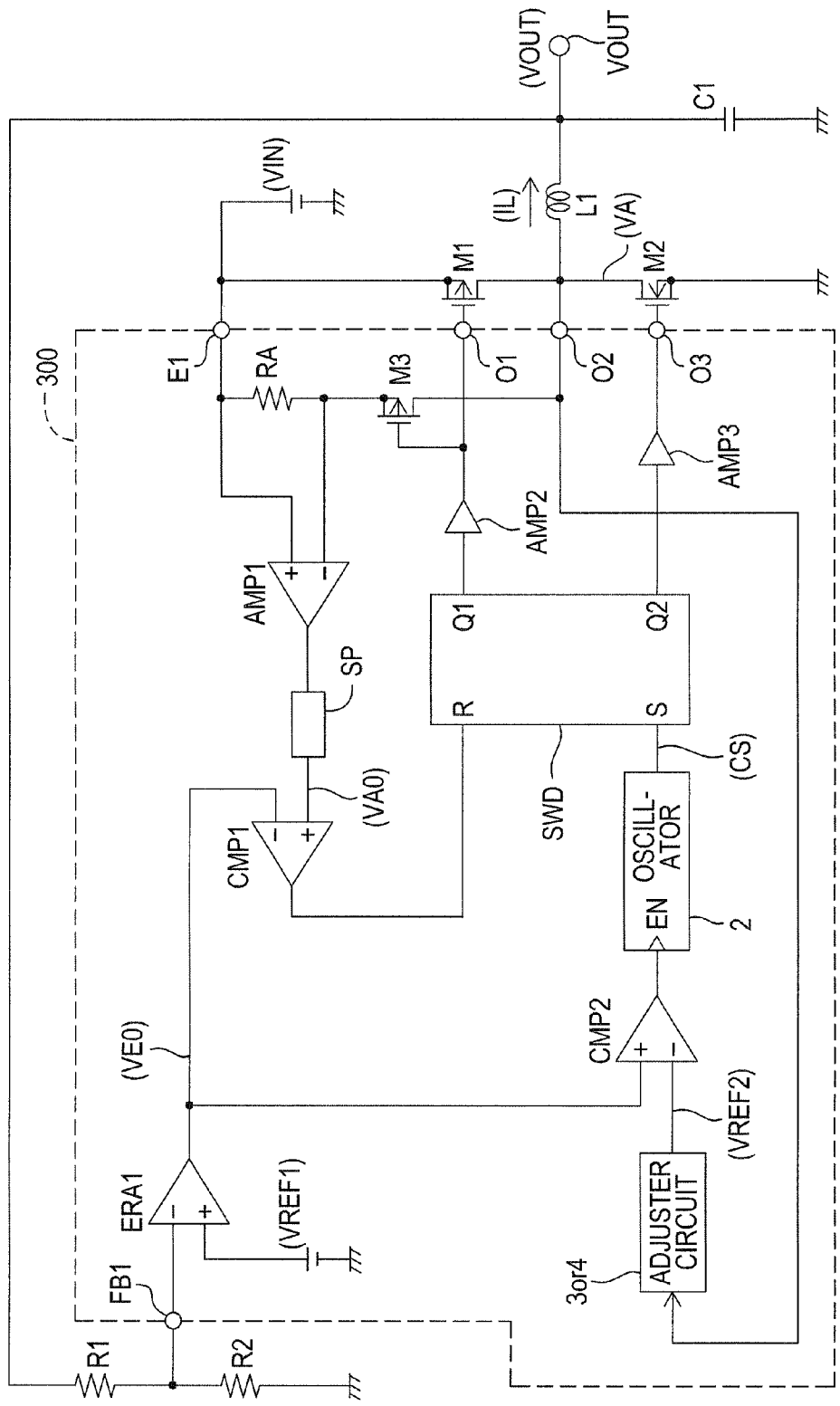
FIG. 6 illustrates the power supply device according to a second embodiment.

A power supply device according to the second embodiment is described below with reference to FIG. 6. As illustrated in FIG. 6, the power supply device includes the power control device 300.

In the second embodiment in FIG. 6, an adjuster circuit 3 or 4 is used instead of the adjuster circuit 1 or 5 used in the first embodiment in FIG. 3. In the first embodiment in FIG. 3, the adjuster circuit 1 or 5 receives the input voltage (VIN) and the output voltage (VOUT). In the second embodiment in FIG. 6, the adjuster circuit 3 or 4 receives a drain-source voltage (VA) of an NMOS transistor M2 instead of receiving an input voltage (VIN) and an output voltage (VOUT). The other elements of the configuration illustrated in FIG. 6 are substantially the same as those in FIG. 3 illustrating the first embodiment, and the description thereof is omitted.

Figure 7:
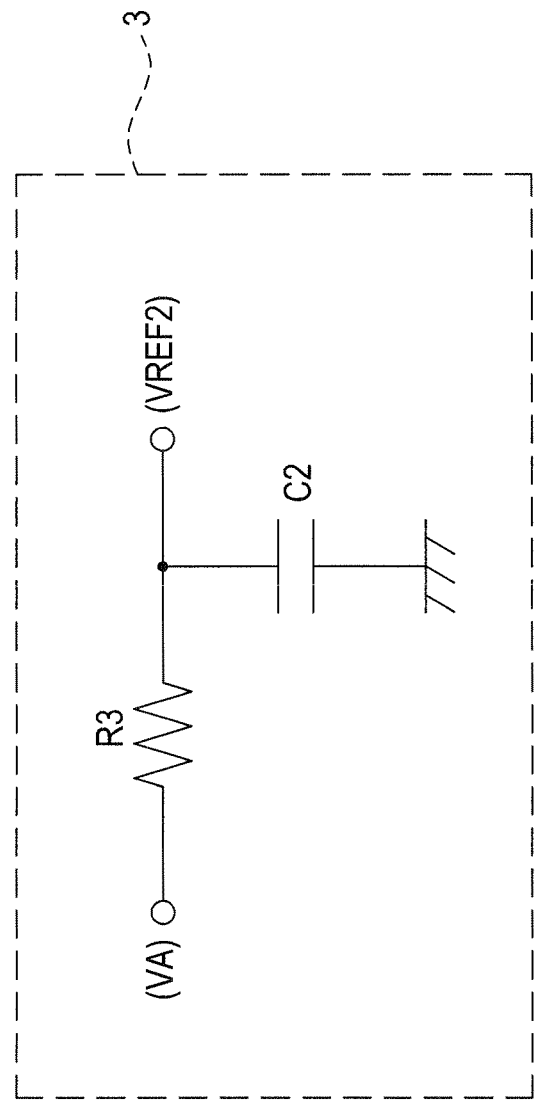
FIG. 7 illustrates a first adjuster circuit of the power supply device in FIG. 6.

FIG. 7 illustrates the first adjuster circuit 3 according to the second embodiment and a configuration thereof is described below.

As illustrated in FIG. 7, the drain-source voltage (VA) of the NMOS transistor M2 is applied to a terminal of a resistor R3. The other terminal of the resistor R3 is coupled to a terminal of a capacitor C2. The other terminal of the capacitor C2 is grounded. The ungrounded terminal of the capacitor C2 functions as an output terminal of the first adjuster circuit 3. A voltage between the terminals of the capacitor C2 is a second reference voltage (VREF2).

Figure 8:
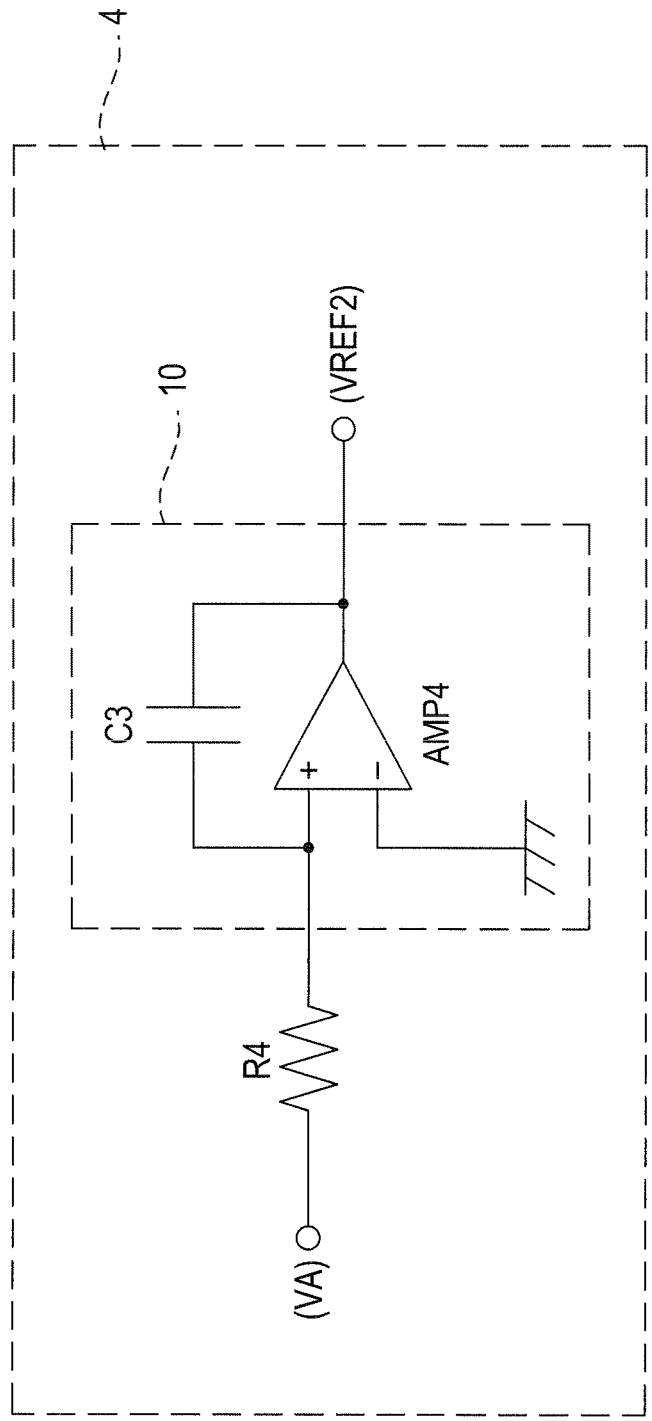
FIG. 8 illustrates a second adjuster circuit of the power supply device in FIG. 6.

In the second embodiment in FIG. 6, the second adjuster circuit 4 in FIG. 8 may be used instead of the first adjuster circuit 3 in FIG. 7.

As illustrated in FIG. 8, the drain-source voltage (VA) of the NMOS transistor M2 is input to a terminal of a resistor R4. The other terminal of the resistor R4 is coupled to a terminal of a capacitor C3 and a non-inverting input terminal of an amplifier AMP4. An inverting input terminal of the amplifier AMP4 is grounded. An output terminal of the amplifier AMP4 is coupled to the other terminal of the capacitor C3. The output terminal of the amplifier AMP4 functions as an output terminal of the second adjuster circuit 4. The second reference voltage (VREF2) is output from the output terminal of the amplifier AMP4.

Operations of the second embodiment in FIG. 6 are described below. The first adjuster circuit 3 in FIG. 7 or the second adjuster circuit 4 in FIG. 8 receives the drain-source voltage (VA) of the NMOS transistor M2, and the drain-source voltage (VA) periodically changes. The drain-source voltage (VA) of the NMOS transistor M2 is smoothed by the capacitor C2 in the first adjuster circuit 3 in FIG. 7, or the capacitor C3 and the amplifier AMP4 in the second adjuster circuit 4 in FIG. 8, and the second reference voltage (VREF2) is output.

As the ratio of the output voltage (VOUT) to the input voltage (VIN) approaches 1:1, the duty ratio of the drain-source voltage (VA) of the NMOS transistor M2 increases. As the duty ratio of the drain-source voltage (VA) of the NMOS transistor M2 increases, the value of the voltage obtained by the smoothing increases. As the ratio of the value of the output voltage (VOUT) to the value of the input voltage (VREF2) approaches 1:1, the value of the second reference voltage (VREF2) increases.

The second adjuster circuit 5 according to the first embodiment in FIG. 3 may be combined with any one of the first adjuster circuit 1 according to the first embodiment in FIG. 3, the first adjuster circuit 3 according to the second embodiment in FIG. 6, and the second adjuster circuit 4 according to the second embodiment in FIG. 6. For example, the second terminal of the switching circuit SW1 may be coupled to any one of the output terminal of the first adjuster circuit 1 according to the first embodiment in FIG. 3, the output terminal of the first adjuster circuit 3 according to the second embodiment in FIG. 6, and the output terminal of the second adjuster circuit 4 according to the second embodiment in FIG. 6, instead of receiving the constant voltage (E2) in the second adjuster circuit 5 according to the first embodiment illustrated in FIG. 3.

According to the configurations obtained by the above-described combinations, the duty ratio becomes 50% or more, the value of the second reference voltage (VREF2) increases depending on the slope compensation, and as the slope compensation is performed for a longer time, the value of the second reference voltage (VREF2) increases.

The voltage (VE0) is an example of a difference. The oscillator 2 is an example of a signal generation circuit. The current (IIN) is an example of a current proportional to an input voltage. The current (IOUT) corresponds to a current proportional to an output voltage. A circuit 6 including the resistor RIN and the NMOS transistor M4 (see FIG. 4) is an example of a first input circuit. A circuit 7 including the resistor ROUT and the NMOS transistor M6 (see FIG. 4) is an example of a second input circuit. A circuit 8 including the PMOS transistor M7 and the NMOS transistor M10 is an example of a computing circuit (see FIG. 4). The capacitor C2 in FIG. 7 is an example of a smoothing part. A circuit 10 including the capacitor C3 and the amplifier AMP4 (see FIG. 8) is an example of a smoothing part. The PMOS transistor M1 and the NMOS transistor M2 are examples of a switching element.

According to the aspects described above, another reference voltage may be adjusted based on the ratio between the input voltage value and the output voltage value. Thus, the switching operations may be stopped by adjusting the another reference voltage even when the operational conditions change based on the ratio between the input voltage value and the output voltage value.

Although the aspects in accordance with aspects of the present invention are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the aspects of the invention and the concepts contributed by the inventor to furthering the art, and are to be construed as being without limitation to such specifically recited examples and conditions, nor does the organization of such examples in the specification relate to a showing of the superiority and inferiority of the aspects of the invention. Although the embodiments in accordance with aspects of the present invention have been described in detail, it should be understood that various changes, substitutions, and alterations could be made hereto without departing from the spirit and scope of the invention.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A power control device for performing switching control for an output voltage of a power supply device, the power control device comprising:
   a signal generation circuit configured to receive a second reference voltage and a difference between a value of the output voltage and a value of a first reference voltage, compare the difference with the second reference voltage, and stop the switching control when a value of the difference is less than or equal to the value of the second reference voltage; and
   an adjuster circuit configured to receive an input voltage and the output voltage, adjust the second reference voltage based on a ratio between a value of an input voltage and the value of the output voltage and output an adjusted second reference voltage to the signal generation circuit as the second reference voltage.

2. The power control device according to claim 1, wherein the adjuster circuit increases the value of the second reference voltage as the ratio of the value of the output voltage to the value of the input voltage approaches 1:1.

3. The power control device according to claim 2, wherein the adjuster circuit increases the value of the second reference voltage when the value of the input voltage becomes less than or equal to a twofold value of the output voltage.

4. The power control device according to claim 2, wherein the adjuster circuit comprises:
   a first input circuit configured to generate a current proportional to the input voltage;
   a second input circuit configured to generate a current proportional to the output voltage; and
   a computing circuit configured to compute the ratio of the value of the output voltage to the value of the input voltage.

5. The power control device according to claim 1, wherein the switching control is a step-down peak current control including slope compensation.

6. A power supply device, comprising:
   a switch configured to supply power from an input end of the power supply device to an output end of the power supply device based on switching control;
   a signal generation circuit configured to receive a second reference voltage and a difference between a value of an output voltage and a value of a first reference voltage, compare the difference with the second reference voltage, and stop the switching control for the switch when a value of the difference is less than or equal to the value of the second reference voltage; and
   an adjuster circuit configured to receive an input voltage and the output voltage, adjust the second reference voltage based on a ratio between a value of an input voltage and the value of the output voltage and output an adjusted second reference voltage to the signal generation circuit as the second reference voltage.

7. The power supply device according to claim 6, wherein the adjuster circuit increases the value of the second reference voltage as the ratio of the value of the output voltage to the value of the input voltage approaches 1:1.

8. The power supply device according to claim 7, wherein the adjuster circuit increases the value of the second reference voltage when the value of the input voltage becomes less than or equal to a twofold value of the output voltage.

9. The power supply device according to claim 7, wherein the adjuster circuit comprises:
   a first input circuit configured to generate a current proportional to the input voltage;
   a second input circuit configured to generate a current proportional to the output voltage; and
   a computing circuit configured to compute the ratio of the value of the output voltage to the value of the input voltage.

10. The power supply device according to claim 6, wherein the switching control is a step-down peak current control including slope compensation.

11. A power control method for performing switching control for an output voltage of a power supply device, the power control method comprising:
    receiving a second reference voltage and a difference between a value of the output voltage and a value of a first reference voltage;
    comparing the difference with a value of a second reference voltage;
    receiving an input voltage and the output voltage to adjust the value of the second reference voltage based on a ratio between a value of an input voltage and the value of the output voltage and output an adjusted second reference voltage to be subjected to the comparing as the second reference voltage; and
    stopping the switching control when a value of the difference is less than or equal to the value of the second reference voltage.

12. The power control method according to claim 11 further comprising increasing the value of the second reference voltage as the ratio of the value of the output voltage to the value of the input voltage approaches 1:1 during the adjusting.

13. The power control method according to claim 12 further comprising wherein increasing the value of the second reference voltage when the value of the input voltage becomes less than or equal to a twofold value of the output voltage during the adjusting.

14. The power control method according to claim 12 further comprising:
    generating a current proportional to the input voltage;
    generating a current proportional to the output voltage; and
    computing the ratio of the value of the output voltage to the value of the input voltage.

15. The power control method according to claim 11 further comprising switch-controlling a step-down peak current and slope compensation.

16. The power supply device according to claim 1, wherein the signal generation circuit includes a comparator that compares the difference with the second reference voltage.

* * * * *